United States Patent
Bass et al.

(10) Patent No.: US 6,854,164 B2
(45) Date of Patent: Feb. 15, 2005

(54) TERMINATION DEVICE FOR AN ARAMID-BASED ELEVATOR ROPE

(75) Inventors: Patrick M. Bass, Lakeside, CA (US); Robert Sweet, Lakeside, CA (US)

(73) Assignee: Thyssen Elevator Capital Corp, Whittier, CA (US)

( * ) Notice: Subject to any disclaimer, the term of this patent is extended or adjusted under 35 U.S.C. 154(b) by 0 days.

(21) Appl. No.: 10/353,139

(22) Filed: Jan. 28, 2003

(65) Prior Publication Data

US 2004/0143940 A1 Jul. 29, 2004

(51) Int. Cl.[7] ............................. F16G 11/00; F16G 11/04
(52) U.S. Cl. ................ 24/136 R; 24/122.6; 24/115 M; 403/211
(58) Field of Search .......................... 24/136 R, 115 G, 24/115 M, 122.6, 136; 403/211, 314, 374.1; 187/411, 408, 254

(56) References Cited

U.S. PATENT DOCUMENTS

| | | | |
|---|---|---|---|
| 1,369,842 A | * | 3/1921 | Schaffernocker .......... 24/136 K |
| 1,380,800 A | * | 6/1921 | Hawoth ....................... 403/211 |
| 2,085,333 A | * | 6/1937 | Reynolds ..................... 403/211 |
| 3,520,032 A | * | 7/1970 | Howlett et al. ............. 24/122.6 |
| 3,654,672 A | * | 4/1972 | Bullar ........................ 24/136 K |
| 3,905,711 A | | 9/1975 | Rogers .......................... 403/16 |
| 4,362,288 A | * | 12/1982 | Allen .......................... 248/613 |
| 4,561,154 A | | 12/1985 | Briscoe et al. ................ 24/136 |
| 4,602,891 A | | 7/1986 | McBride ...................... 403/211 |
| 5,243,739 A | | 9/1993 | Schmidt ....................... 24/135 |
| 5,353,893 A | | 10/1994 | Sun et al. |
| 5,553,360 A | | 9/1996 | Lucas et al. .................. 24/136 |
| 2001/0014996 A1 | | 8/2001 | Ericson et al. |

FOREIGN PATENT DOCUMENTS

| | | |
|---|---|---|
| DE | 3623407 A1 | 1/1988 |
| GB | K04609 | 2/1911 |
| SU | 572619 | 9/1977 |

* cited by examiner

Primary Examiner—Robert J. Sandy
(74) Attorney, Agent, or Firm—Frost Brown Todd LLC

(57) ABSTRACT

A termination device for an aramid-based elevator rope comprises a socket having a tapered internal passageway adapted to receive a wedge and a rope. The passageway has first and second semi-cylindrical rope engaging surfaces. The wedge has a peripheral groove having a variable radius of curvature. The device clamps the length of rope between linear portions of the wedge and the rope engaging surfaces of the socket with a substantially uniform application of force on the cross-section of the rope.

7 Claims, 4 Drawing Sheets

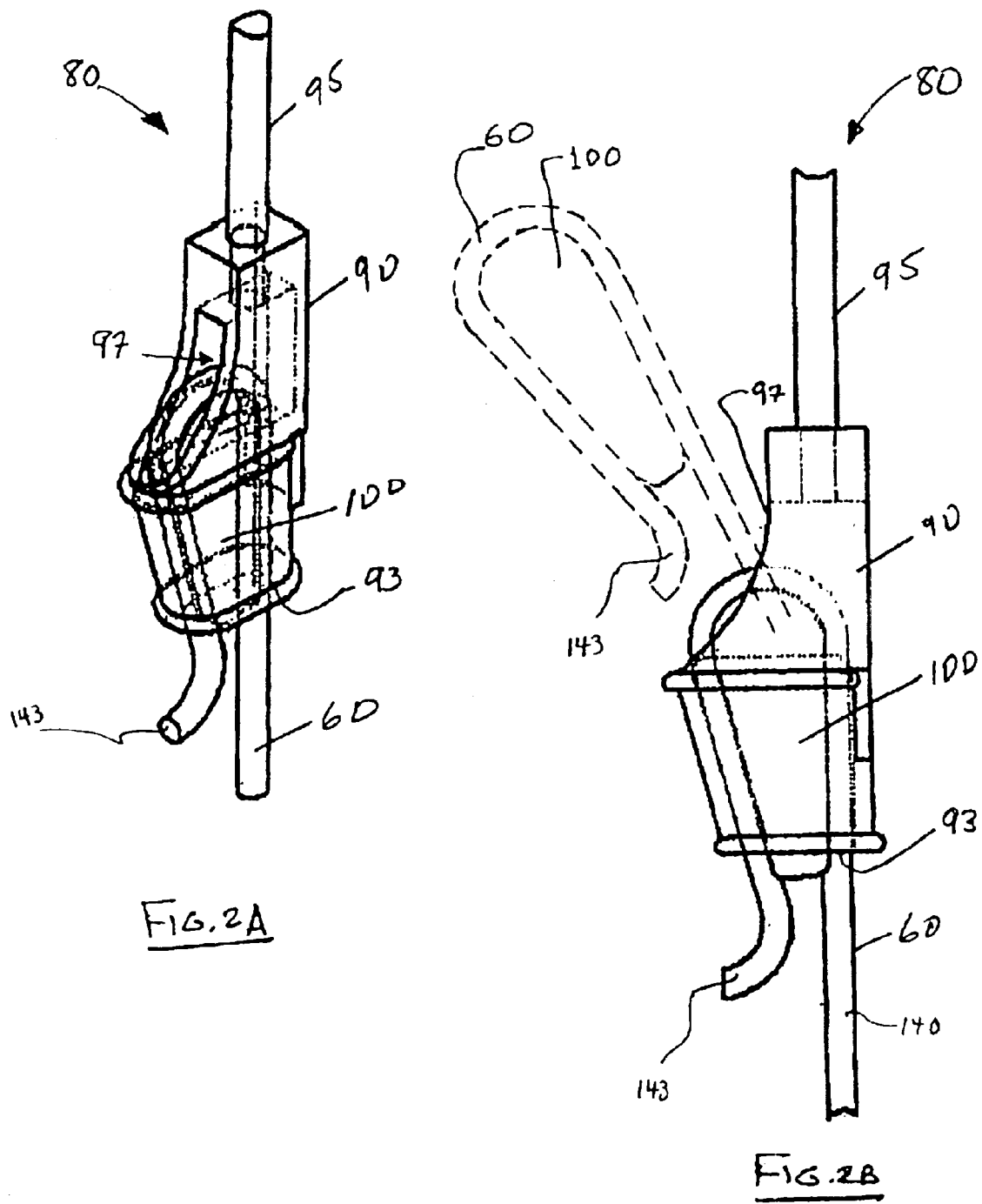

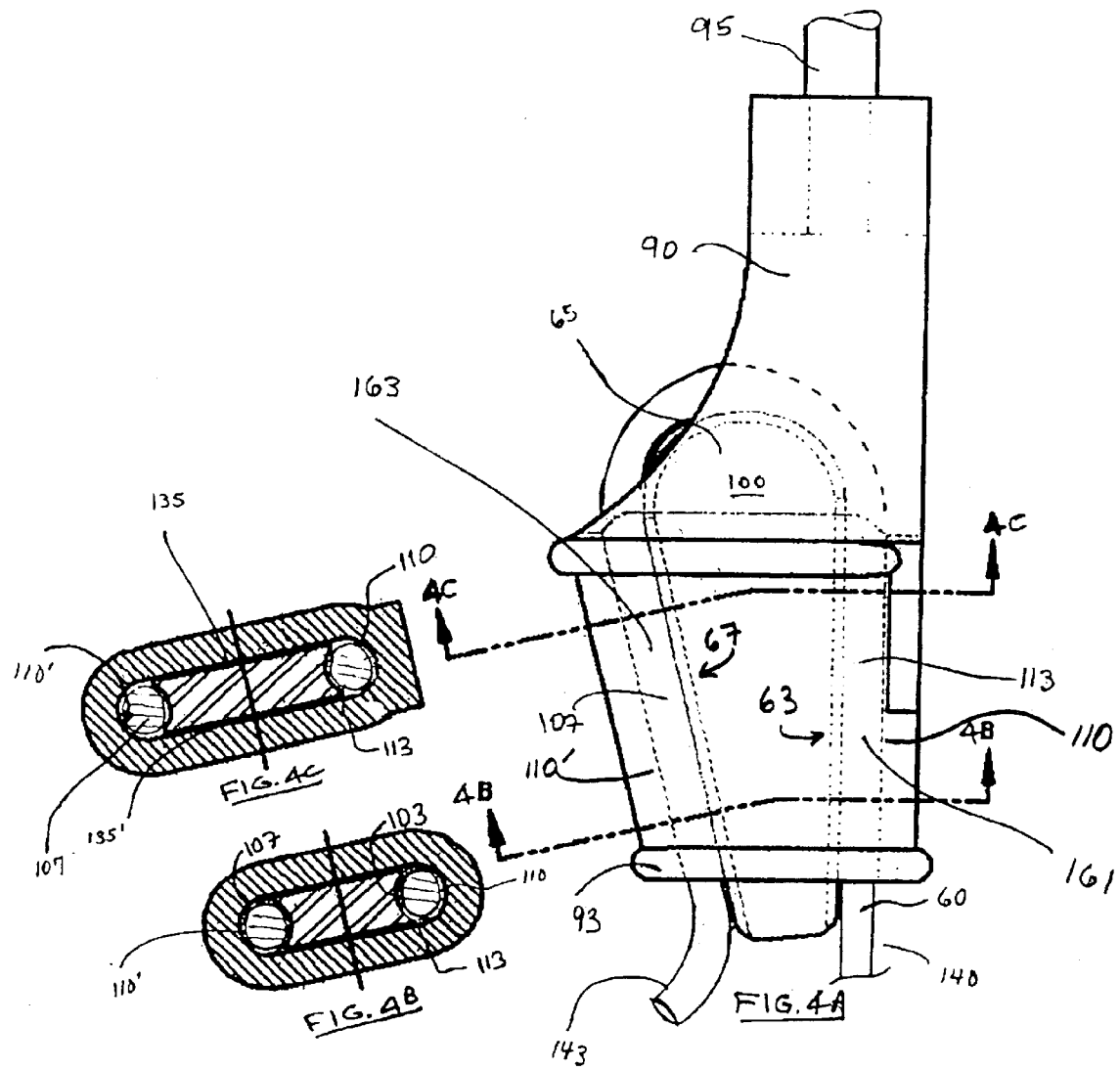

TERMINATION DEVICE FOR AN ARAMID-BASED ELEVATOR ROPE

FIELD OF THE INVENTION

This invention relates to the field of elevator systems in general, and more particularly to termination devices for aramid-based elevator ropes.

BACKGROUND OF THE INVENTION

Traction elevator systems typically include a cab, a counterweight, one or more ropes interconnecting the cab and counterweight, a traction sheave to move the rope(s), and a motor to rotate the traction sheave. Elevator ropes conventionally comprise laid or twisted steel wire and the sheave is formed of cast iron.

Conventional steel ropes and the cast iron sheaves that move them have certain limitations in their use. One such limitation is the traction forces between the ropes and the sheave. Drive sheaves with large diameters are often needed to obtain the required traction to move the components in the system without the rope slipping over the sheave. Another limitation on the use of steel ropes is the flexibility and fatigue characteristics of steel wire ropes. Aramid-based ropes are being developed to overcome the problems associated with steel cables. Conventional termination devices, however, do not readily lend themselves to use with aramid-based ropes. Aramid-based ropes tend to slip out of such devices and consequently a dangerous condition may result.

Accordingly, there is a need for a termination device that can accommodate aramid-based elevator ropes.

SUMMARY OF THE INVENTION

The present invention provides a termination device for an aramid-based elevator rope. The termination device comprises a socket having a longitudinal tapered passageway extending from a rear opening to a front opening. The passageway is defined by first and second semi-cylindrical rope engaging surfaces and transverse walls between the rope engaging surfaces. The rope engaging surfaces converge toward one another to define the taper of the passageway. The interior of the passageway is preferably polished.

A wedge is disposed within the tapered passageway of the socket to retain the rope. The wedge, which is substantially the same shape as the passageway, has a large end, a small end, and first and second linear portions between the large and small ends. The wedge contains a peripheral groove for receiving a rope therearound. When the rope is fitted around the wedge and the wedge is pushed into the tapered passageway, the rope passes around the wedge such that a live end of rope and a dead end of rope extend out of the front open end of the passageway from opposites sides of the wedge. The live end of the rope is connected to another component in the elevator system, such as the elevator car or counterweight, whereas the dead end of the rope does not bear a load. The wedge may be formed from any material which will retain its structural integrity and can keep the rope secured in the device without slippage. The wedge is preferably constructed of polished steel.

The peripheral groove on the wedge has a variable of radius of curvature. The groove preferably approximates the shape of that portion of the aramid rope which comes into contact with the groove when the rope is secured between the wedge and the socket.

In a preferred embodiment, the first and second semi-cylindrical rope engaging surfaces of the socket have a constant radius of curvature. In this embodiment, the first semi-cylindrical rope engaging surface of the socket and the first linear portion of the wedge define an first passage having an oblong cross section. Similarly, the second semi-cylindrical rope engaging surface of the socket and the second linear portion of the wedge define a second passage having an oblong cross section. A first length of rope from a live end passes through the first passage. The rope then loops around the large end of the wedge within the peripheral groove and a second length of the rope passes through the second passage out to a dead end.

The first passage applies a substantially constant force on the cross-section of the first length of rope passing therethrough. Similarly, the second passage applies a substantially constant force on the cross-section of the second length of rope. The rope is locked within the socket-wedge combination, and the assembly exerts a substantially uniform force on the cross-section of the rope, which reduces the chance for mechanical failure. Aramid-based ropes tend to fail mechanically if they are subjected to undue changes in compression along the longitude of the rope. The uniform forces applied on the rope in the present invention minimize the occurrence of such failure. In an additional enhancement, the small end of the wedge has rounded edges between the transverse portions and the small end along the peripheral groove, and the small end extends out of the front opening of the passageway. The rounded edges are also used to reduce the change in compressive force experienced by the rope of this juncture.

The socket may have a fastener for attaching the termination device to a fixed point in an elevator hoistway. In a preferred embodiment, the fastener is a support rod attached to the socket.

BRIEF DESCRIPTION OF THE DRAWINGS

FIG. 2A is a perspective drawing of the rope termination device of the invention showing the socket and wedge and a rope inserted therein.

FIG. 2B is a plan view of the device shown in FIG. 2A.

FIG. 4A is an enlarged view of the rope termination device of the invention.

FIG. 4B is a cross-section of the socket and wedge taken along lines 4B—4B of FIG. 4A.

FIG. 4C is a cross-section of the socket and wedge taken along lines 4C—4C of FIG. 4A.

DETAILED DESCRIPTION

Figure 1:
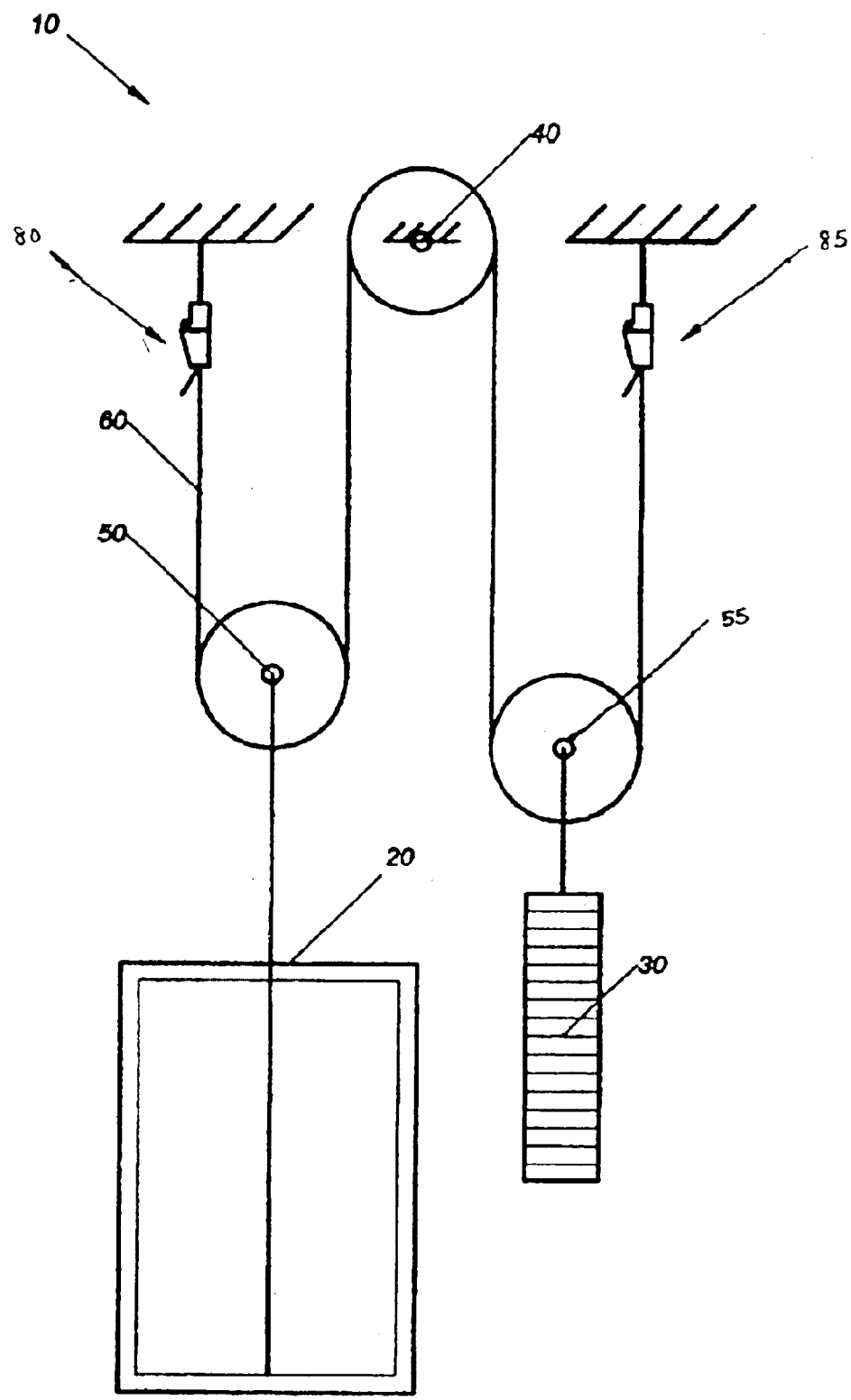
FIG. 1 is an illustration of a typical traction elevator system showing the interconnection of various components of the system, including the termination devices according to the present invention.

FIG. 1 is an illustration of a traction elevator system 10. The system includes car 20, counterweight 30, and traction drive sheave 40. The car and the counterweight are connected to one another by a tension member 60 that rides over drive sheave 40, and sheaves 50 and 55, located over car 20 and counterweight 30, respectively. The tension member 60 is attached to the top of the hoistway at its ends by rope termination devices 80 and 85.

Tension member 60 shown in FIG. 1 preferably comprises an aramid-based rope. Suitable aramid materials include Kevlar® aramid fiber (manufactured by E.I. du Pont De Nemours and Company). Termination devices 80 and 85 are used to terminate the aramid-based rope in a manner that is secure and safe.

FIG. 2A shows a perspective view of an assembly of rope termination device 80 of the present invention. FIG. 2B shows a plan view of the same device. The device comprises socket 90 capable of housing a wedge 100 having rope 60 wrapped around it.

The socket 90 has an internal longitudinal passageway extending from a rear opening 97 to a front opening 93. The passageway is defined by first and second semi-cylindrical rope engaging surfaces 110 and 110' and transverse walls 135 and 135' (see FIGS. 4B and 4C).

Figure 3A:
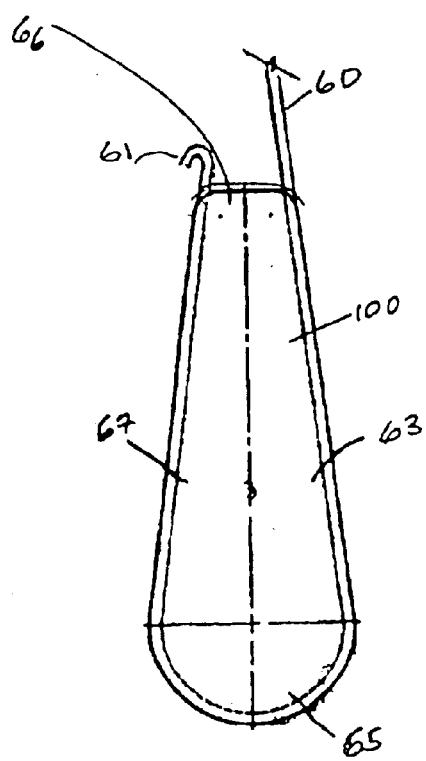
FIG. 3A is a plan view of a wedge according to the present invention.
Figure 3B:
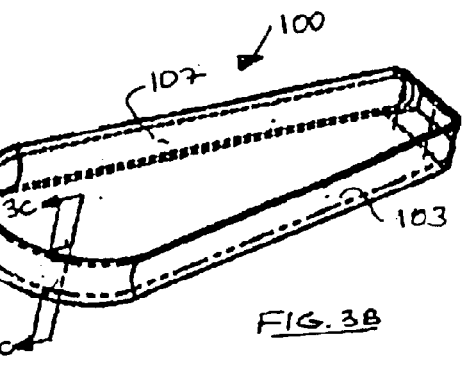
FIG. 3B is a perspective view of a wedge showing the various portions of a peripheral groove according to the present invention.
Figure 3C:
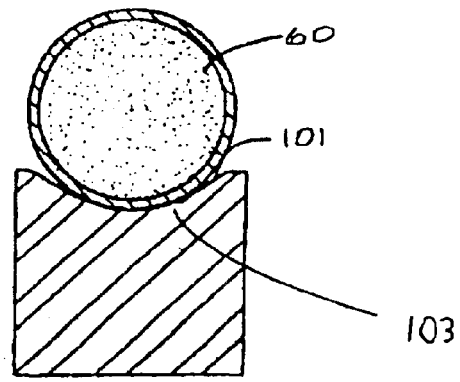
FIG. 3C is a cross-section of the peripheral groove of the wedge taken along lines 3C—3C of FIG. 3B with a rope riding therein.

As shown in FIGS. 3A and 3B, the wedge 100 has a large end 65, small end 66 and first and second linear portions, 63 and 67. The wedge also contains a peripheral groove 103, which will receive rope 60 along a portion 101 of the rope circumference, as better seen in FIG. 3C. The peripheral groove 103 has a variable radius of curvature.

Referring to FIG. 4A–C, the first and second semi-cylindrical rope engaging surfaces of the socket 110 and 110' each have a constant radius of curvature. The first semi-cylindrical rope engaging surface 110 and the first linear portion 63 of the wedge define an first passage 113, which has a substantially oblong cross-section. Similarly, the second semi-cylindrical rope engaging surface 110' and the second linear portion 67 define a second passage 107, which also has a substantially oblong cross-section.

As shown in FIG. 4A, a rope 60 is inserted into the termination device 90 such that a first length 161 of the rope coming from a live end 140 passes through the first passage 113. The rope 60 then loops around the large end 65 of the wedge 100, and a second length 163 of the rope passes through second passage 107 and out of the front end 93 of the socket to a dead end 143. When the wedge 100 is locked in the passageway of the socket 90, the first passage 113 exerts a uniform compressive force on the cross-section of the first length 161 of rope passing therethrough. The second passage 107 also exerts a uniform compressive force on the cross-section of the second length 163 of rope passing therethrough. The uniform forces on the rope in the first and second passages 113 and 107 effectively lock the rope 60 in place yet the passages do not create any substantial spikes or differential compressive forces on the cross-section of the rope lengths contained therein.

While the invention has been particularly shown and described with reference to particular embodiments, those skilled in the art will understand that various changes in form and details may be made without departing from the spirit and scope of the invention.

What is claimed is:

1. An aramid-based elevator rope and termination device comprising:

a socket having a longitudinal tapered passageway extending from a rear opening to a front opening, the passageway defined by first and second semi-cylindrical rope engaging surfaces converging toward one another, and transverse walls between the rope engaging surfaces, the first and second semi-cylindrical rope engaging surfaces have a constant radius of curvature;

a wedge disposed within and being of substantially the same shape as the tapered passageway, the wedge having a large end, a small end, and first and second linear portions between the large and small ends;

the wedge comprising a peripheral groove having a variable of radius of curvatures;

the first semi-cylindrical rope engaging surface of the socket and the first linear portion of the wedge defining a first passage having an oblong cross section, the second semi-cylindrical rope engaging surface of the socket and the second linear portion of the wedge defining a second passage having an oblong cross section; and an aramid-based elevator rope for suspending an elevator having a first length in the first passage, a second length in the second passage and a third length in the peripheral groove around the large end of the wedge, the first and second passages applying a substantially constant force on the cross-section of the first and second lengths of rope, respectively, and the cross-section of the first and second lengths is oblong corresponding to the shape of the first and second passages.

2. The aramid-based elevator rope and termination device of claim 1, wherein the small end of the wedge has rounded edges between the linear portions and the small end along the peripheral groove, and the small end extends out of the front opening of the passageway.

3. The aramid-based elevator rope and termination device of claim 1, wherein the socket has a fastener for attaching the device to a fixed point in an elevator hoistway.

4. The aramid-based elevator rope and termination device of claim 3, wherein the fastener is a support rod.

5. The aramid-based elevator rope and termination device of claim 4, wherein the first and second rope engaging surfaces of the tapered passageway are polished.

6. The aramid-based elevator rope and termination device of claim 5, wherein the peripheral groove of the wedge is polished.

7. The aramid-based elevator rope and termination device of claim 6, wherein the wedge is polished.

* * * * *

UNITED STATES PATENT AND TRADEMARK OFFICE
CERTIFICATE OF CORRECTION

PATENT NO. : 6,854,164 B2
DATED : February 15, 2005
INVENTOR(S) : Patrick M. Bass and Robert Sweet It is certified that error appears in the above-identified patent and that said Letters Patent is hereby corrected as shown below:

<u>Column 4,</u>
Line 19, after "...of radius of...", delete "curvatures" and insert -- curvature --.

Signed and Sealed this

Twenty-fourth Day of May, 2005

JON W. DUDAS
*Director of the United States Patent and Trademark Office*